(12) United States Patent
Clark

(10) Patent No.: US 7,228,664 B2
(45) Date of Patent: Jun. 12, 2007

(54) FLEXIBLE SPACE MANAGEMENT SYSTEM AND METHOD

(75) Inventor: Todd A. Clark, Janesville, WI (US)

(73) Assignee: Hufcor, Inc., Janesville, WI (US)

( * ) Notice: Subject to any disclaimer, the term of this patent is extended or adjusted under 35 U.S.C. 154(b) by 704 days.

(21) Appl. No.: 10/694,239

(22) Filed: Oct. 27, 2003

(65) Prior Publication Data
US 2005/0086876 A1 Apr. 28, 2005

(51) Int. Cl.
E04H 1/00 (2006.01)
E04H 14/00 (2006.01)
E04H 3/00 (2006.01)
E04H 5/00 (2006.01)
E04H 6/00 (2006.01)

(52) U.S. Cl. .......................... 52/243.1; 52/64; 52/174; 49/25; 49/125

(58) Field of Classification Search ............... 52/64, 52/243.1, 745.05, 174; 49/25, 125, 126, 49/127, 128; 340/10.1, 572.1, 568.1; 235/375; 700/95, 115
See application file for complete search history.

(56) References Cited

U.S. PATENT DOCUMENTS

| 3,654,732 | A | * | 4/1972 | Schacht | 49/127 |
| 3,810,330 | A | * | 5/1974 | Daggy | 49/127 |
| 5,548,926 | A | * | 8/1996 | Sjoholm | 49/127 |
| 5,749,172 | A | * | 5/1998 | Isopahkala | 49/127 |
| 6,698,491 | B2 | * | 3/2004 | Goldsmith et al. | 160/199 |
| 6,715,530 | B2 | * | 4/2004 | Goldsmith et al. | 160/199 |

* cited by examiner

Primary Examiner—Naoko Slack
Assistant Examiner—Chi Q. Nguyen
(74) Attorney, Agent, or Firm—Michael Best & Friedrich LLP

(57) ABSTRACT

A method of managing a plurality of operable wall panels in a room equipped with an overhead track system from which the panels suspend and in which the panels are movable to selectively partition the room, the track system including a reading portion. The method comprising providing an identification tag on each of the plurality of panels, each identification tag having panel information, and wirelessly communicating between the identification tag of each of the plurality of panels and a controller, wherein the controller being operable to receive and transmit panel control data comprising the panel information.

12 Claims, 6 Drawing Sheets

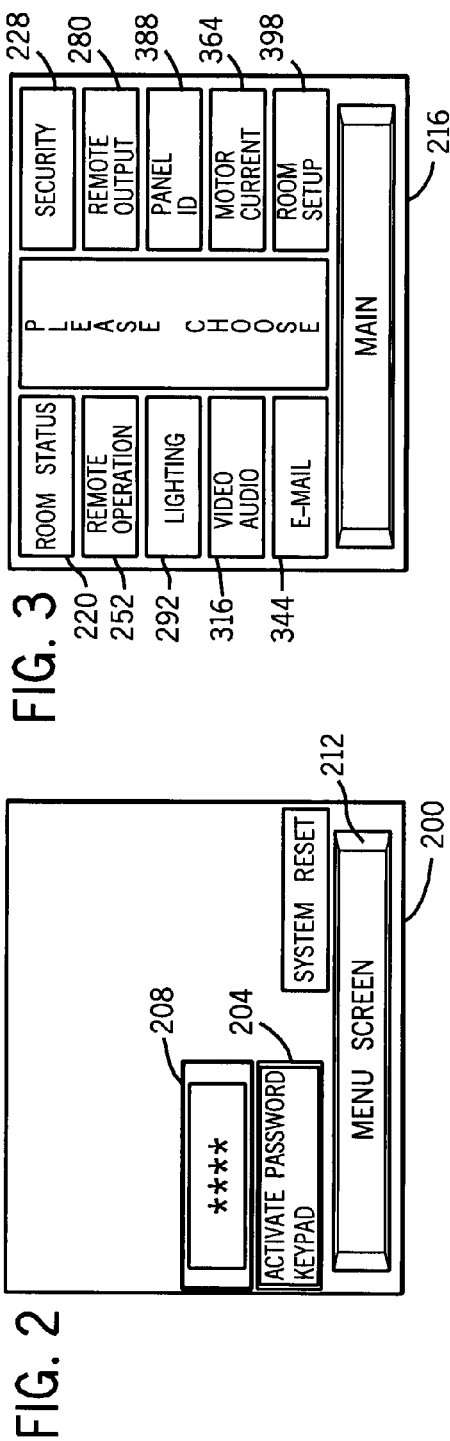
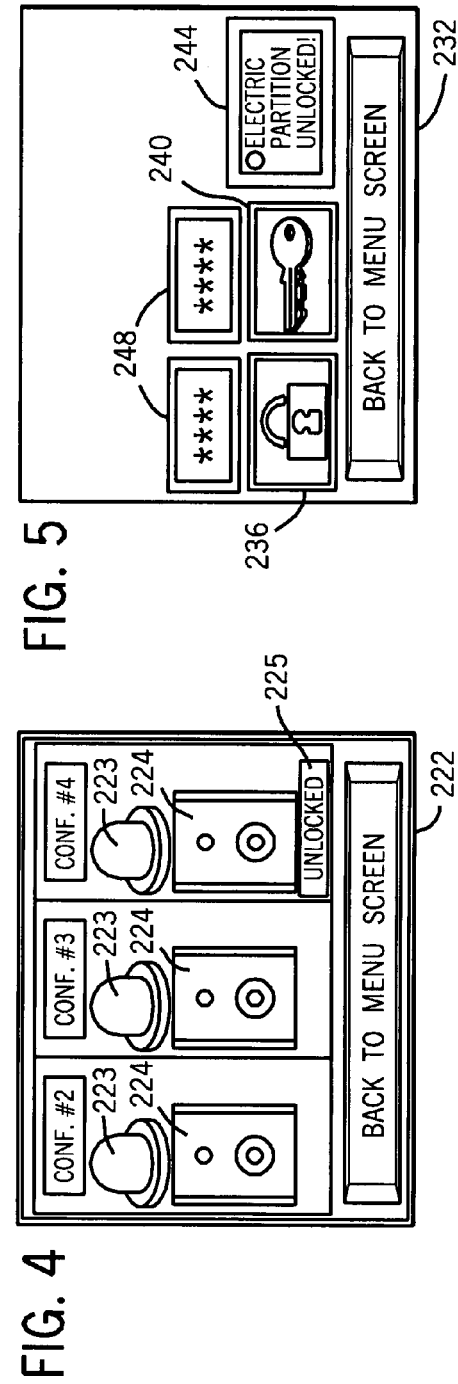

FLEXIBLE SPACE MANAGEMENT SYSTEM AND METHOD

BACKGROUND OF THE INVENTION

The invention generally relates to space management. In particular, the invention relates to a control system for space management.

Flexible space management using partitions comprising a plurality of operable wall panels has in the past been performed manually. For example, layouts and configurations of a space using partitions are typically done using computer generated prints, numbers, manual calculations, and color-coding methods. After the layouts or the configurations of partitions are obtained on prints, the space is generally partitioned manually. In other words, the wall panels are manually moved and installed at locations according to the layouts. The manual installation is often time consuming and confusing for the operator.

Additionally, various factors such as complexity of the layouts, the number of panels, and the size of the space will reduce the likelihood that the installed partitions match the layouts. To re-install, to change, or to expand the partitions in the event of user error may add considerable amount of installation time and labor costs to a project. Depending on the layouts configured for the space, some panels will require periodic maintenance after installation because they are used more frequently than other panels. However, it is often the case that all panels are examined and maintained on a single rigid inspection schedule, even though more frequently used panels may require more frequent maintenance than panels that are less frequently used. Thus, maintaining the panels can become inefficient and costly.

SUMMARY OF THE INVENTION

Accordingly, the invention provides a system and method for managing a plurality of operable wall panels in a room equipped with an overhead track system from which the panels suspend and in which the panels are movable to selectively partition the room. The system includes an identification tag on each of the wall panels, and a communication module that communicates with the identification tags to identify and track each panel. The method includes wirelessly reading the identification tags and transmitting the data to a controller which uses the data for various functions.

The invention may also include an apparatus and method for managing other aspects (for example, lighting, heating, cooling, audio, and video systems) for the space to be partitioned so that the partitioned spaces are isolated from each other and function independently from one another.

Other features and advantages of the invention will become apparent to those skilled in the art upon review of the following detailed description, claims, and drawings.

BRIEF DESCRIPTION OF THE DRAWINGS

In the drawings:

FIG. 2 shows an initial screen according to the present invention;

FIG. 3 shows a choice screen according to the present invention;

FIG. 4 shows a room status screen according to the present invention;

FIG. 5 shows a security screen according to the present invention;

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
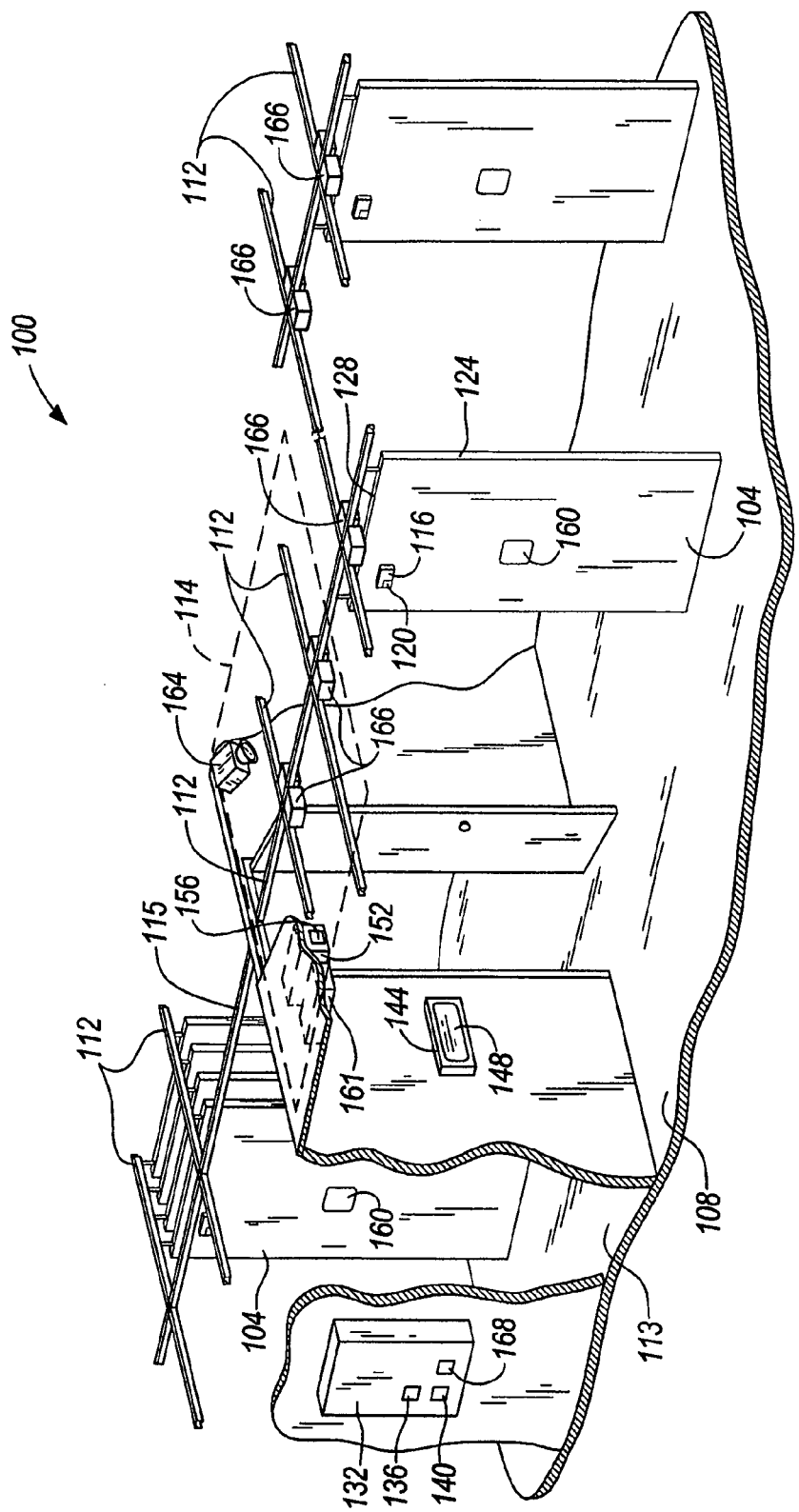
FIG. 1 shows a panel system according to the present invention.

FIG. 1 shows a panel system 100 according to the present invention. The system 100 includes an operable wall panel 104 in a room 108 equipped with an overhead track system 112. The panel 104 is suspended from carriers in the track system 112, and the carriers have rollers or other means for permitting the carrier and attached panel to be movable in the track system 112 to selectively partition the room 108. A plurality of additional panels are stacked in a storage room or a stack area 113 adjacent the room 108. An operator may move the stack of panels on either side of an exit track 115 that is part of the track system 112, and that extends out of the storage room 113 and into the room 108. Once the operator has aligned a selected panel with the exit track 115, the operator may push or pull the selected panel into the room 108. The track system 112 includes a reading portion 114 into which the panel 104 is moved when first entering the room 108. The panel 104 is read and identified in the reading portion 114. The process of reading and identifying a panel is detailed hereinafter.

The system 100 identifies a panel by an identification tag 116 attached to or embedded in the panel 104. The identification tag 116 includes a radio-frequency identification tag or a transponder 120 to respond to any inquiry of the panel 104. The transponder 116 shown in the embodiment is a passive transponder. However, it will be appreciated that other transponder types such as active or battery-powered transponders can also be used. The identification tag 116 may be located in any one of a variety of positions on the panels, such as a lead vertical rail 124 of the panel 104, a top horizontal rail 128, and on the outside of the panel 104 adjacent to the top horizontal rail 128. The transponder 120 is equipped with both read and write capabilities, and also includes information identifying the panel 104, an antenna to receive and transmit data, some memory and circuitry to process information. It would be appreciated that the identification tag 116 can include other identifiers such as a bar code identifier 130. The identification tag 116 illustrated in FIG. 1 includes both the transponder 120, and the bar code identifier 130, but it will be appreciated that the identification tag 116 may alternatively include one or the other. An exemplary transponder is RI-TRP-W9VS from Texas Instruments.

The system 100 also includes a control module or a controller 132. The controller 132 includes a micro-controller 136, such as CTC 5100 series controller or CTC 2700 series controller, a radio-frequency identification controller or a transceiver 140 such as Series 2000 Reader system from Texas Instruments, relays, power supply, analog input and output cards, industrial enclosure, and other small components. The transceiver 140 transmits and receives information to and from the identification tag 116. The transceiver 140 then relays the received information to the micro-controller 136. Details of the communication are described hereinafter. The system 100 also includes a user interface 144 that is coupled to the controller 132 with appropriate wiring. The controller 132 is illustrated as being in a room adjacent to the room 108, but it can alternatively be near to or adjacent the user interface 144 or in a remote locations. The user interface 144 can be coupled to the controller 132 with a network, such as Intranet and Internet. In other embodiments, the user interface 144 is hardwired to the controller 132. The user interface 144 can come in different sizes dependent on needs. The user interface 144 typically includes a touch screen 148, while a keypad and a display combination or a voice activated interactive system can also be used. In the case of a remote user interface, the remote use interface can be a computer browser, for example.

The system 100 also includes a communication module 152 that may further include an antenna 156. The communication module 152 is positioned and oriented to wirelessly communicate with the identification tag 116. Specifically, the communication module 152 receives information from the controller 132, and scans for the information on the panels in the room 108, or transmits to an optional second user interface. The second user interface can be a panel interface 160, or an overhead interface 161. The panel interface 160 is located on the panel 104, while the overhead interface 161 is located near the communication module 152. The second user interface may include audio and visual aides such as speakers and displays.

When the identification tag 116 includes the bar code identifier 130, the communication module 152 will include a scanner such as CLV 430/431/432 scanners from SICK. The scanner of the communication module 152 will thus scan for the bar code 130 of the identification tag 116 to identify the panel 104. In such case, the identification tag 116 is passive, and the controller 142 will react to the read or scanned bar codes accordingly and similarly to the identification tag 116 that has the transponder 120. In the embodiment shown, the communication module 152 is positioned in the ceiling of the room 108. However, it will be appreciated that the communication module 152 can be positioned in other locations within the reading portion 114. Furthermore, when the bar code identifier 130 is used, the scanner of the communication module 152 can be wireless and portable such that a user can take the scanner and scan for information on the bar code 130. The scanned bar code information is then wirelessly transmitted to the communication module 152, and subsequently to the controller 132. The scanner transmits and receives data in the sense of transmitting a laser beam to the bar code identifier 130, and reading or receiving the bar code information from the bar code identifier 130.

The second user interface can be configured to relay information received from the controller 132. For example, a user can select a floor plan for the room 108 at the interface 144, or at the touch screen 148. In response to the user's selection, the controller 132 will establish an arrangement of selected panels consistent with the selected floor plan and provide audio and/or visual information helpful in properly positioning the panels in accordance with the floor plan. While radio frequency is used in the transmission and reception of information between the communication module 152 and the panel 104, other types of scanning of the identification tags 116 can also be used. Bar code scanning such as discussed above, proximity sensing using sensors such as Series PD sensors from Automation Direct, photo-electric sensing, capacitance sensing, laser sensing, vision sensing using system such as Series 600 SmartReader from DVT, and the like are other exemplary scanning techniques that can also be used.

As each panel is moved into the reading portion 114 of the track system 112, and the panel information is fed to the controller 132, the controller 132 will determine if the panel 104 is to be used in establishing the floor plan. The controller 132 will also determined where the panel 104 is to be positioned in the track system 112. In some embodiments, the communication module 152 may also include a second transceiver to read and write information. The controller 132 then wirelessly communicates via the communication module 152 instructional information to the second user interface. The second user interface will then provide instructions to a user to guide a proper panel into proper position in the track system 112 in accordance with the selected floor plan. Furthermore, the system 100 also includes a web cam or a video camera 164 that is coupled to the controller 132. The video camera 164 allows users to monitor carriers, the track system 112, seals of the panels, sweeps of the panels, and the like remotely, or off-site.

The system 100 will also include a number of electric diverters 166 in the track system 112 and communicating with the controller 132. The controller 132 automatically actuates the electric diverters 166 to guide each panel into a proper location in the track system 112 in accordance to the selected floor plan. When the second user interface is also used, the controller 132 will also send instructions to the second user interface to assist the user to put the panel into correct positions. Specifically, when the panel 104 is moved near a junction, the controller 132 will send out instructions via the communication module 152 such as audio signal or video signal to indicate the direction in which the panel 104 should be moved, visually or audibly. For example, the panel interface 160 will visually indicate a left turn ahead with a flashing left turn arrow, or the overhead interface 161 will visually indicate a left turn ahead with a flashing left turn arrow.

The system 100 also includes a database 168 that is accessible by the controller 132. The database 168 can be located in the controller 132, or also remotely in a networked drive (not shown). The database 168 typically includes background data on each of the panels in the system 100. The background data or panel information can include a variety of entries, such as project name, project number, series, face materials, panel number, panel size, date installed, date of last service, description of last service, name of service agency, local distributor contact information, warranty status, and amperage data. The user interface 144 communicates with the controller 132 to display the panel background information when selected. For example, the controller 132 uses the read identification tag information to retrieve background data from the database 168, and displays the selected background data on the touch screen 148.

To help facilitate space management, the present invention is also operable to perform a variety of functions using the interface 144. FIGS. 2–12, 14, and 15 illustrate some of the functions provided by the system 100. FIG. 2 shows an initial access screen 200. The initial access screen 200 identifies and authenticates a user of the system 100 (of FIG. 1). For example, a user has to activate a password activation keypad 204. Once activated, the user is prompted to enter a password in a password entry area 208. After the password has been entered, the system 100 will identify and authenticate the user. Once the user has been authenticated, the system 100 classifies the user such that the user will only be able to access certain system functions. In other embodiments, once the user has been authenticated, the system 100 allows the user to access all system functions. It will be appreciated that even though the password activation keypad 204 and the password entry area 208 are shown to be on the touch screen 148, other interactive or interface can also be used.

When a menu screen area 212 is selected, a number of system functions will be available to the user. FIG. 3 illustrates an exemplary choice screen 216. The choice screen 216 allows the user to operate and control the system 100 in a variety of different ways. For example, when a room status area 220 has been selected, a room status screen 222 is displayed (see FIG. 4) for all rooms managed by the system 100 (for example, conference rooms 2, 3 and 4 as illustrated in FIG. 4). The room status screen 222 includes an indicator 223 of whether there are stacked partitions in the conference room. The room status screen 222 also indicates (as at 224) whether the speakers located in these conference rooms have been activated. In particular, FIG. 4 also shows that the partitions in conference room 4 have been unlocked (shown in area 225). When a partition is unlocked, the user can control (for example, extend or stack) the partitions either from the interface 144, or at the partitions.

Figure 6:
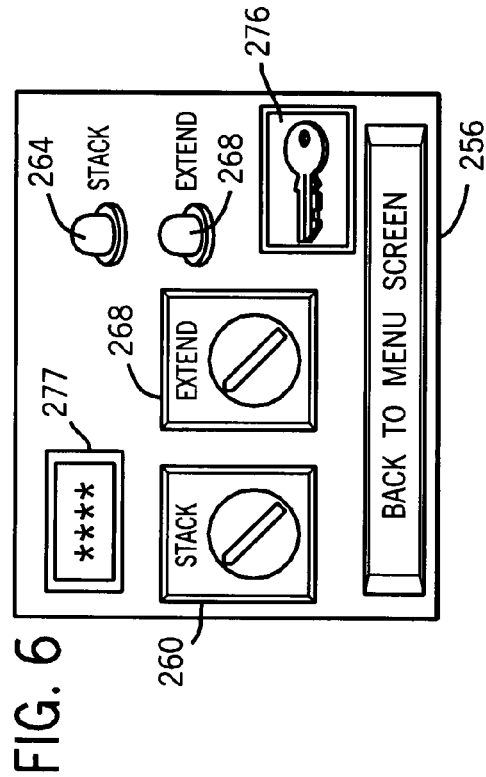
FIG. 6 shows a remote operation screen according to the present invention.

Referring back to FIG. 3, when a security area 228 has been selected, a security screen 232 is displayed as shown in FIG. 5. The security screen 232 allows a user to lockout a partition by selecting a lock area 236, to monitor and control access to a partition, and to unlock and release access of the partition by selecting an unlock area 240. The locked or unlocked status of the partition is displayed in area 244. To lock or unlock a partition, the user will also have to provide a variety of passwords in areas such 248. The system 100 also allows the user to remotely control operations of the system 100 by selecting a remote operation area 252 (of FIG. 3). Once the remote operation area 252 has been selected, the interface 144 displays a remote operation screen 256 as shown in FIG. 6. The remote operation screen 256 allows the user to enter in a password, and to operate the partition remotely. For example, when a stack dial 260 has been selected, the partitions will be stacked in a stack area of the room 108, and a stack light or indicator 264 will also be activated. When an extend dial 268 has been selected, the partitions will be extended in the room 108, and an extend light 272 is activated. The user can also unlock a locked partition by selecting an unlock area 276, and entering a password in area 277.

Figure 7:
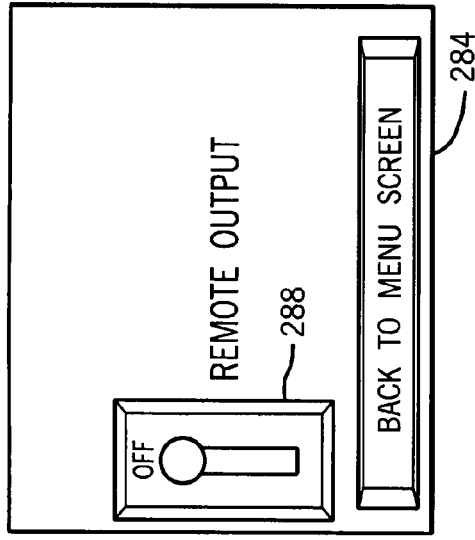
FIG. 7 shows a remote output screen according to the present invention.
Figure 9:
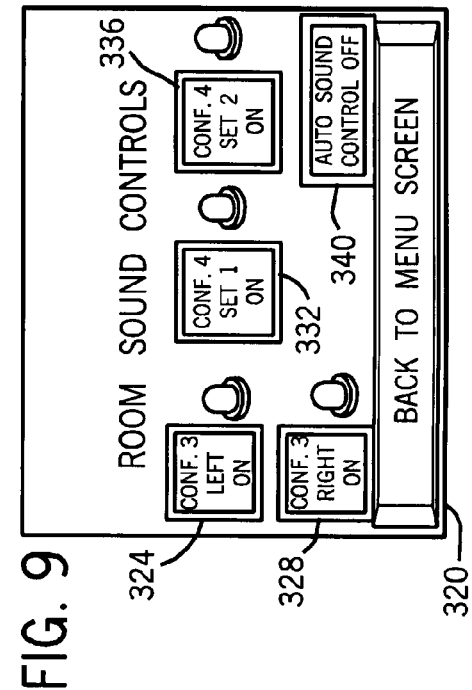
FIG. 9 shows an audio/video screen according to the present invention.

Referring back to FIG. 3, when a remote output area 280 has been selected, a remote output screen 284 is displayed as shown in FIG. 7. The remote output screen 284 allows the user to operate the system 100 or any particular panel of the system 100 from a remote location. The remote output screen 284 also has a switch area 288 that lets the user toggle between allowing and prohibiting remote operations. When a lighting area 292 has been selected from the choice screen 216, the user will be prompted to select a list of rooms in which lighting is to be controlled. For example, the user can select to display lighting control of an entire conference center, a partitioned room of the conference center, or a few partitioned rooms of the conference center. Thereafter, a screen allowing the user to adjust the lighting control is displayed. The screen can be configured to display the lighting control of one room at a time or multiple rooms at the same time, depending on factors such as complexity of the lighting control and the rooms selected.

Figure 8:
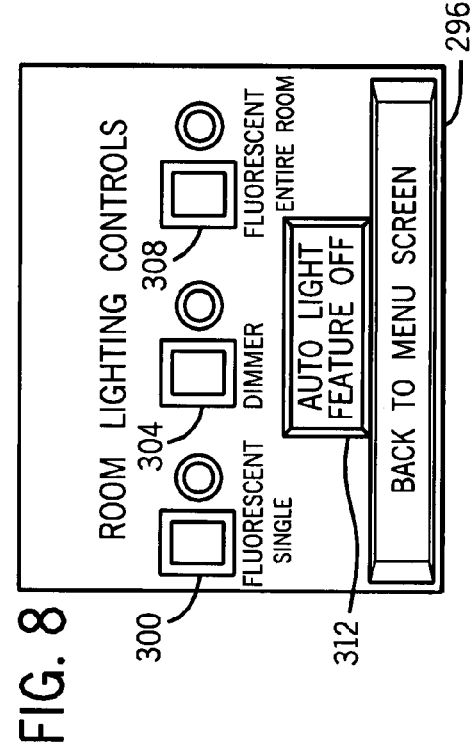
FIG. 8 shows a lighting screen according to the present invention.

An exemplary lighting screen 296 is shown in FIG. 8. In the embodiment shown, the lighting screen 296 is configured to display the lighting control of one selected room. In such case, the user will have to select a second room subsequently to display the lighting control of the second room when necessary. The lighting screen 296 generally provides a number of lighting control buttons, such as a single fluorescent button 300, a dimmer button 304, a room fluorescent button 308, and an auto light off button 312. The number of lighting control buttons can be different when the selected room is configured differently, or when a different room is selected. These buttons (300, 304, 308, 312) thus allow the user to control the lighting of the selected room using the interface 144 or the touch screen 148. The lighting screen 296 also allows the user to control the lighting of a room manually and automatically by using the auto light off button 312.

Similarly, when an audio/video area 316 is selected from the choice screen 216, the user will be prompted to select a list of rooms in which an audio/video system is to be controlled. For example, the user can select to display an audio/video control system in an entire conference center, a partitioned room of the conference center, or a few partitioned rooms of the conference center. Thereafter, a screen allowing the user to control the audio/video system is displayed. The screen can be configured to display the audio/video system control of one room at a time, or multiple rooms at the same time, depending on factors such as complexity of the audio/video control and the rooms selected. An exemplary audio/video screen 320 is shown in FIG. 8. In the embodiment shown, the audio/video screen 320 provides a few audio/video control buttons that allow a user to control the audio and video of a room manually and automatically. It will be appreciated that the number of audio/video control buttons can be different when the selected room is configured differently, or when a different room is selected. The audio/video screen 320 provides a left audio on/off button 324 and a right audio on/off button 328 that control the audio of conference room 3. Audio on/off buttons 332, 336 are also provided to control the audio sets 1 and 2 of conference room 4, respectively. An auto sound control on/off button 340 is also provided for the user to control the sound of a room manually and automatically.

Figure 10:
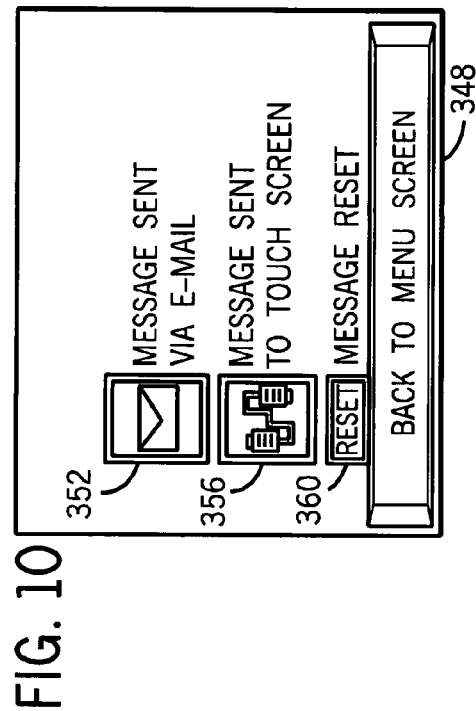
FIG. 10 shows an e-mail screen according to the present invention.

Referring again back to FIG. 3, when an e-mail area 344 has been selected, an e-mail screen 348 is displayed as shown in FIG. 10. The exemplary e-mail screen 348 allows the user to send and receive messages both locally and in a networked environment with e-mail. Particularly, the exemplary e-mail screen 348 provides three selections, although any number of selections can also be provided in other embodiments. The user is allowed to send e-mail messages to user-defined recipients by selecting an e-mail area 352. Alternatively, the user is allowed to send messages to the interface 144, or the touch screen 148 by selecting a message-to-screen area 356. The user can also reset the messages being sent out or received at the touch screen 148 by selecting a message-reset area 360. For example, a user can arrange to automatically send a maintenance message or a warranty message to a distributor when a particular panel has been used for a number of times. With the messages sent, the user can also keep track of the warranty time remaining on a particular panel in the system 100.

Figure 11:
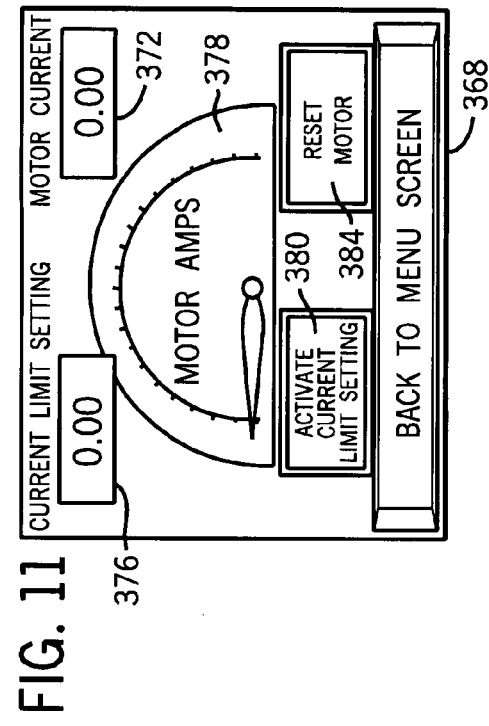
FIG. 11 shows a motor current screen according to the present invention.

When the user selects a motor current area 364 (of FIG. 3), a motor current screen 368 is displayed as shown in FIG. 11. With the motor current screen 368, the user can monitor current commanded by motor operating in the system 100 in a motor current monitor area 372. The user is also allowed to set an upper maximum current level in a current limit setting area 376 before a panel or a partition halt an extending operation. The motor current screen 368 also provides a graphical display 378 of the current commanded by a motor operating in the system 100. To set or to activate the maximum current level, the user has to select a current limit activation limit area 380, and enters a desired current limit level. Similarly, the user can reset the current limit commanded by the motor by selecting a reset motor area 384. Once the reset motor area 384 has been selected, either a default current limit or no current limit will be set.

Figure 12:
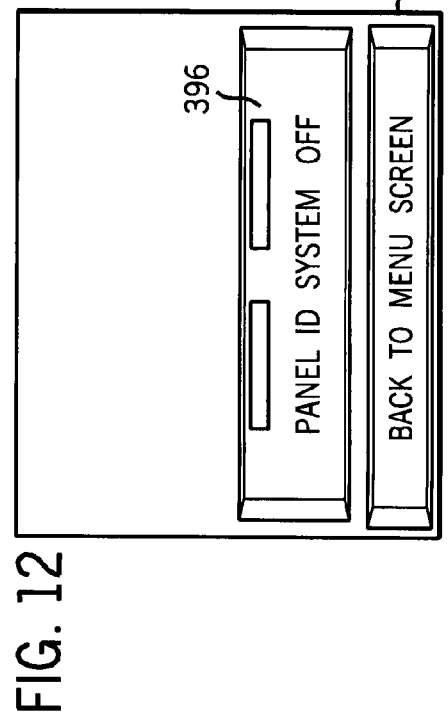
FIG. 12 shows a panel identification screen according to the present invention.

The user interface 144 also allows the user to access information regarding the panels used in the system 100. For example, the user can select a panel identification area 388 to display information regarding a panel used in the system 100. An exemplary panel identification screen 392 is shown in FIG. 12. The panel identification screen 392 provides a panel identification display switch 396 that activates or deactivates the display of panel information. When the panel identification display switch 396 has been activated, different panel information can be programmed to be displayed on the interface 144, or the touch screen 148. For example, the user can configure the system 100 to display information such as build date, series, wall covering, and warranty status of a particular panel on the interface 144. Other panel information that can be displayed includes project name, project number, partition number, panel series, panel materials, panel number, panel size, installation date, date of last service, types of services performed on the panel, panel owner information, local distributor information, electrical specification such as amperage data, and the like. Furthermore, as each panel is moved, the controller 132 also updates the number of times the particular panel is used in the database 168.

Figure 13:
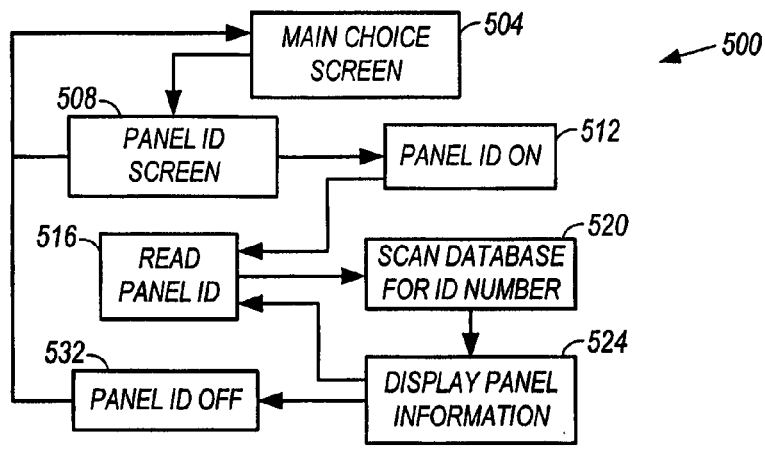
FIG. 13 shows an identification process used to identify panel information according to the present invention.

The system 100 accesses the panel information with an identification process 500 such as shown in FIG. 13. Once the panel identification area 388 (of FIG. 3) has been selected at block 504, the interface 144 (of FIG. 1) displays the panel identification screen 392 (of FIG. 12) at block 508. When the user has selected to activate the panel identification display switch 396 at block 512, the identification tag 116 is read from the panel 144 at block 516. The controller 132 (of FIG. 1) will then scan for and retrieve panel information from the database 168 at block 520. The retrieved panel information is thereafter displayed at the interface 144 or the touch screen 148 at block 524. When the panel identification display switch 396 has been deactivated at block 528, the data flow procedure 500 will return to the panel identification screen 392 at block 532.

Figure 14:
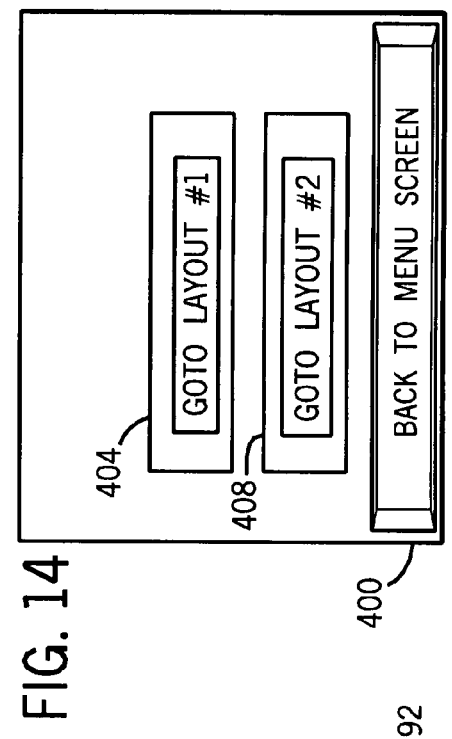
FIG. 14 shows a room setup screen according to the present invention.
Figure 15:
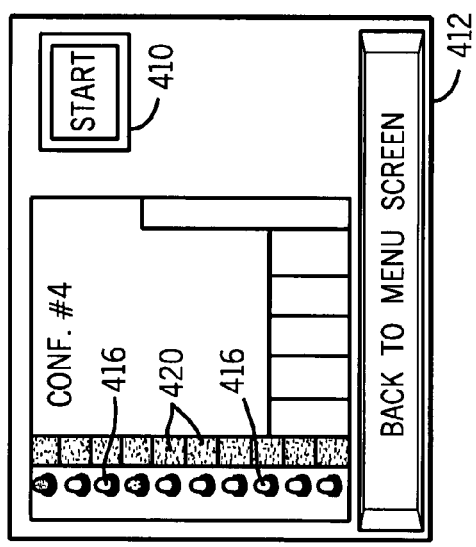
FIG. 15 shows a first layout screen according to the present invention.

Referring back to FIG. 3, when the user selects a room setup area 398, a room setup screen 400 is displayed as shown in FIG. 14. The room setup screen 400 allows the user to select from a plurality of floor plans or room layouts 404, 408 for the room 108. Although the room setup screen 400 shows two different layout selections, the room setup screen 400 can be configured to provide more selections, and as many as desired by the user. In such case, the selections can be configured to occupy less screen areas. Referring back to FIG. 14, when the first layout 404 has been selected, a layout screen 412 as shown in FIG. 15 is displayed. Upon pushing a start button 410 on the layout screen 412, the layout screen 412 will assist the user in setting up the room 108 according to the floor plan or the room layout selected.

Figure 16:
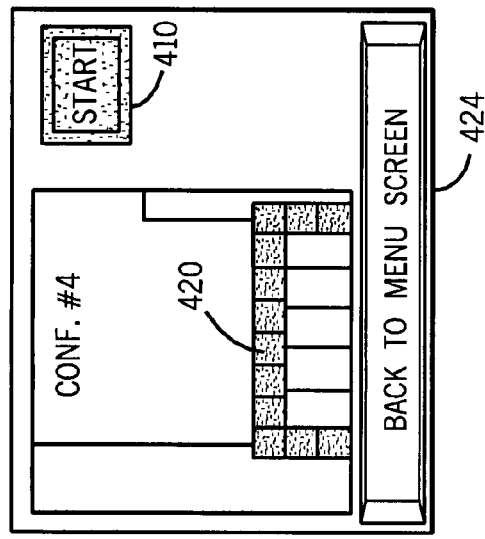
FIG. 16 shows a second layout screen according to the present invention.
Figure 17:
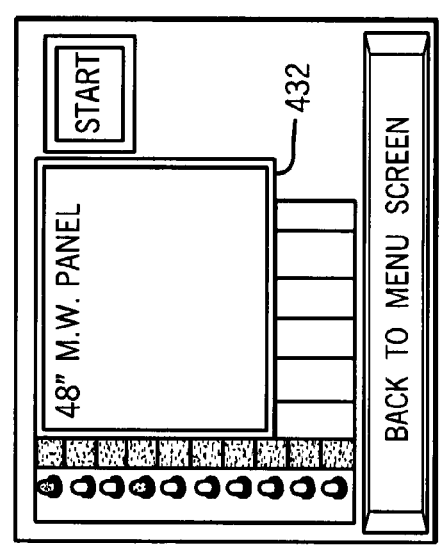
FIG. 17 shows a pop-up window in the first layout screen according to the present invention.

Specifically, the layout screen 412 provides a number of lights 416 and a same number of panel icons 420. Each panel icon 420 has a corresponding light 416, and each panel icon 420 also represents an actual physical panel to be used in the floor plan. When a panel is moved from a stack area past the reading portion 114, the identification tag 116 will be read and identified by the controller 132 wirelessly via the communication module 152. When the panel is a correct panel according to the floor plan, a corresponding light 416 will be lit with a first color, for example, green. When an incorrect panel is chosen, the corresponding light 416 will be lit with a second color, for example, red. The layout screen 412 also assists the controller 132 in controlling the electric diverters 166 in the track system 112. Similarly, the second layout screen 424 (of FIG. 16) provides a number of panel icons 420 in a second floor plan. Each panel icon 428 represents an actual physical panel to be used in the floor plan. When a panel is moved from a stack area past the reading portion 114, the identification tag 116 will be read and identified by the controller 132 wirelessly via the communication module 152. When the panel icons 420 are selected, basic panel information such as the panel size will be displayed in a pop-up window 432 as shown in FIG. 17.

Figure 18:
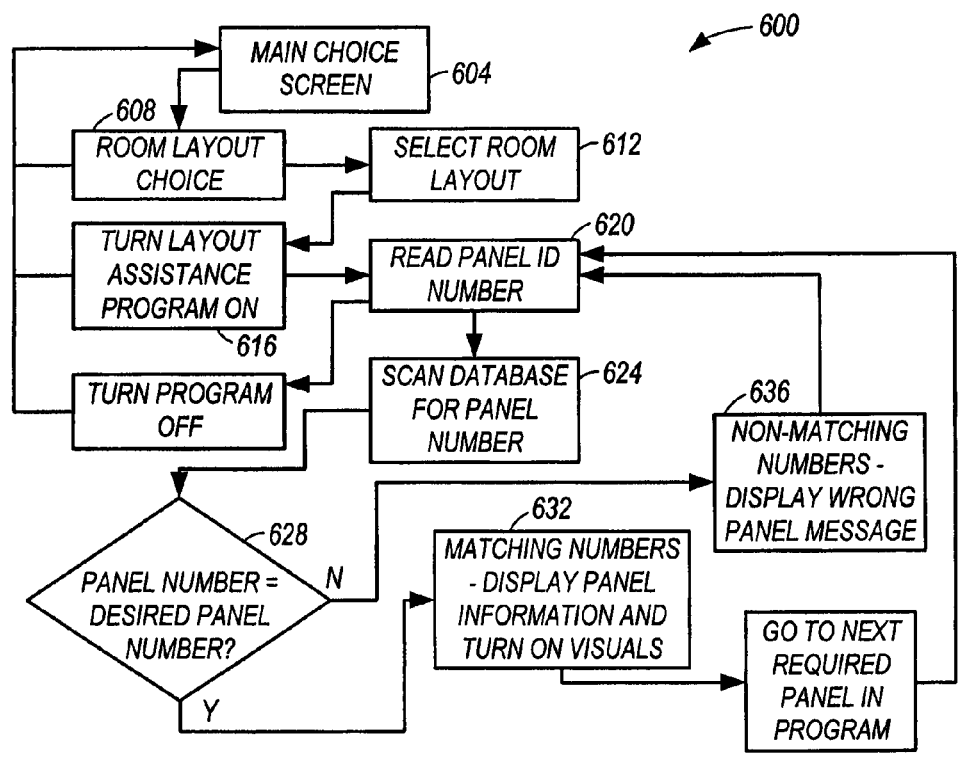
FIG. 18 shows a layout process according to the present invention.

More specifically, a layout process 600 is shown in FIG. 18 to illustrate how the layout screens 412 and 424 work. When the room setup area 398 (of FIG. 3) has been selected from the choice screen 216 at block 604, the room setup screen 400 (FIG. 14) is displayed at block 608. Once a specific layout has been selected at block 612, a layout assistance program is activated at block 616. The controller 132 thereafter reads the identification tag 116 of the panels in the room 108 at block 620, and determines where the panels are located using the responses from the transponder 120. The database 168 is then searched for the information corresponding to the read identification tags 116 at block 624. The searched information is then compared to the panel information of the selected floor plan at block 628. If there is a match, the user interface 144 will indicate or display the light 416 with the first color at block 632. The process is then repeated for the remaining panels. However, the user interface 144 will display the light 416 with the second color at block 636 when the searched information and the desired information do not match.

Various features and advantages of the invention are set forth in the following claims.

The invention claimed is:

1. A system for managing a plurality of operable wall panels in a room equipped with an overhead track system from which the panels suspend and in which the panels are movable to selectively partition the room, the track system including a reading portion, the system comprising:
   an identification tag on each of the plurality of panels and containing panel information;
   a communication module positioned and oriented to wirelessly communicate with the identification tag of each of the plurality of panels that is moved into the reading portion of the track system; and
   a controller communicating between the identification tag and the controller to provide panel information from the identification to the controller via the communication module.

2. The system of claim 1, further comprising:
   a database accessible by the controller and containing background data on each of the plurality of panels; and
   a user interface communicating with the controller operable to receive commands from a user and to display information;
   wherein the controller uses the panel information to retrieve background data from the database and causes selected background data to be displayed on the user interface.

3. The system of claim 2, and wherein the user interface comprises a touch screen.

4. The system of claim 2, and wherein the user interface comprises a keypad and a display at the user interface.

5. The system of claim 2, and wherein the user interface is coupled to the controller via a data network.

6. The system of claim 1, wherein the background data includes one or more data entries for each panel selected from the group consisting of project name, project number, series, face materials, panel number, panel size, date installed, date of last service, description of last service, name of service agency, local distributor contact information, warranty status, and amperage data.

7. The system of claim 1, further comprising a user interface permitting a user to select a floor plan for the room; wherein the controller, in response to the user's selection of a floor plan, establishes an arrangement of selected ones of the plurality of panels consistent with the selected floor plan; wherein the controller uses the panel information of each panel moved into the reading position to determine whether the panel is to be used in establishing the floor plan and where the panel is to be positioned in the track system; and wherein the controller, based on the panel information, provides instructional information to the user through the user interface to guide the proper panels into the proper positions in the track system to effectuate the selected floor plan.

8. The system of claim 7, further comprising at least one electric diverter switch in the track system, the at least one electric diverter switch communicating with and being controlled by the controller; wherein the controller automatically actuates the at least one diverter switch to guide each panel to the proper positions in the track system to effectuate the selected floor plan.

9. The system of claim 1, and wherein the identification tag on each panel comprises a transponder.

10. The system of claim 1, and wherein the communication module comprises an antenna configured to communicate with the transponder.

11. The system of claim 1, and wherein the identification tag on each panel comprises a bar code identifier.

12. The system of claim 1, and wherein the communication module comprises a scanner configured to scan for the bar code identifier.

* * * * *